US008207269B2

(12) United States Patent
Fantinel et al.

(10) Patent No.: US 8,207,269 B2
(45) Date of Patent: Jun. 26, 2012

(54) PROCESS FOR OBTAINING POLYMERS OF ETHYLENE AND CYCLOOLEFINS

(75) Inventors: Fabiana Fantinel, Frankfurt (DE); Shahram Mihan, Bad Soden (DE)

(73) Assignee: Basell Polyolefine GmbH, Wesseling (DE)

( * ) Notice: Subject to any disclaimer, the term of this patent is extended or adjusted under 35 U.S.C. 154(b) by 47 days.

(21) Appl. No.: 12/735,151

(22) PCT Filed: Nov. 26, 2008

(86) PCT No.: PCT/EP2008/066242
§ 371 (c)(1),
(2), (4) Date: Jun. 18, 2010

(87) PCT Pub. No.: WO2009/080438
PCT Pub. Date: Jul. 2, 2009

(65) Prior Publication Data
US 2010/0267901 A1 Oct. 21, 2010

Related U.S. Application Data

(60) Provisional application No. 61/008,652, filed on Dec. 21, 2007.

(30) Foreign Application Priority Data

Dec. 20, 2007 (EP) .................................... 07150203

(51) Int. Cl.
C08F 8/00 (2006.01)
C08L 23/00 (2006.01)
C08L 23/04 (2006.01)
C08L 45/00 (2006.01)

(52) U.S. Cl. ......... 525/191; 525/210; 525/211; 525/240
(58) Field of Classification Search .................. 525/191, 525/210, 211, 240
See application file for complete search history.

(56) References Cited

U.S. PATENT DOCUMENTS

| 5,698,487 | A | 12/1997 | Sacchetti et al. |
| 6,399,533 | B2 | 6/2002 | Sacchetti et al. |
| 6,423,660 | B1 | 7/2002 | Albizzati et al. |
| 6,444,604 | B1 | 9/2002 | Albizzati et al. |
| 6,559,252 | B1 | 5/2003 | Horton et al. |
| 6,608,224 | B2 | 8/2003 | Resconi et al. |
| 6,774,194 | B2 | 8/2004 | Albizzati et al. |
| 6,841,501 | B2 | 1/2005 | Resconi et al. |
| 6,878,786 | B2 | 4/2005 | Resconi et al. |
| 6,953,829 | B2 | 10/2005 | Kratzer et al. |
| 7,053,160 | B1 | 5/2006 | Bingel et al. |
| 7,101,940 | B2 | 9/2006 | Schottek et al. |
| 7,141,527 | B1 | 11/2006 | Van Baar et al. |
| 7,163,907 | B1 | 1/2007 | Canich et al. |
| 2002/0137863 | A1 | 9/2002 | Osan et al. |
| 2008/0269445 | A1 | 10/2008 | Mihan |

FOREIGN PATENT DOCUMENTS

| DE | 19962814 | 6/2001 |
| DE | 19962910 | 7/2001 |
| EP | 633272 | 1/1995 |
| EP | 694568 | 1/1996 |
| EP | 849074 | 6/1998 |
| EP | 1820820 | 8/2007 |
| JP | 5230147 | 9/1993 |
| WO | 91/02012 | 2/1991 |
| WO | 92/00333 | 1/1992 |
| WO | 95/32995 | 12/1995 |
| WO | 99/21899 | 5/1999 |
| WO | 00/31090 | 6/2000 |
| WO | 01/21674 | 3/2001 |
| WO | 01/62764 | 8/2001 |
| WO | 2006/063826 | 6/2006 |

Primary Examiner — Nathan M Nutter
(74) Attorney, Agent, or Firm — Dilworth IP LLC

(57) ABSTRACT

A terpolymer containing:
  a) from 90% to 50% by weight; preferably from 90% to 70% by weight of ethylene derived units;
  b) from 5% to 40% by weight; preferably from 5% to 20% by weight of derived units of alpha olefin of formula $CH_2=CHA$ wherein A is a $C_1$-$C_{20}$ alkyl radical;
  c) from 2% to 30% by weight, preferably from 5% to 20% by weight of cycloolefins derived units.

Said terpolymer being characterized by the following features
i) distribution of molecular weight Mw/Mn lower than 3.5; preferably lower than 3; more preferably lower than 2.7
ii) solubility in xylene at 25° C. higher than 99%.

8 Claims, No Drawings

PROCESS FOR OBTAINING POLYMERS OF ETHYLENE AND CYCLOOLEFINS

This application is the U.S. national phase of International Application PCT/EP2008/066242, filed Nov. 26, 2008, claiming priority to European Patent Application 07150203.3 filed Dec. 20, 2007, and the benefit under 35 U.S.C. 119(e) of U.S. Provisional Application No. 61/008,652, filed Dec. 21, 2007; the disclosures of International Application PCT/EP2008/066242, European Patent Application 07150203.3 and U.S. Provisional Application No. 61/008,652, each as filed, are incorporated herein by reference.

The present invention relates to a process for the preparation of ethylene, alpha olefins, cycloolefins terpolymers by using a chromium based catalyst system wherein the U ligands have a particular substitution pattern. Furthermore the present invention relates to the terpolymer directly obtained by said process.

Olefin monomers are widely known as comonomers which are copolymerizable with ethylene monomers and which may be used to modify the structure and properties of polyethylene copolymers, such as the degree of branching of the polymer chain, crystallinity, density, viscosity, polydispersity, etc. In addition to that, the way of olefin incorporation into the final ethylene copolymer and the resulting molecular weight distribution are affected by polymerization conditions, in particular by the choice of catalyst system. Thus, copolymers made of ethylene and other olefin monomers generally may be tailored for various types of application.

Modification of ethylene olefin copolymers may be achieved, for example, by incorporation of further comonomers such as cycloolefins, resulting in cycloolefin copolymers (COC) which may be useful for specific applications.

For example, EP 0 694 568 describes a COC having a solution viscosity (eta) of more than 0.25 dl/g (measured according to DIN 53728 in decalin at 135° C.) and containing polymerized units of (A) cyclic olefins, and (B) optionally acyclic olefins, and (C) polymerized units derived from cyclic or acyclic olefins and comprising at least one functionalized structural moiety which contains at least one heteroatom. The COC may be used in adhesion-promoting agents.

EP 0 849 074 A2 describes a sealing film containing COC which comprises polymerized units of (A) cyclic olefins such as norbornen and derivatives thereof, and (B) optionally acyclic olefins, wherein the film is sealable at a film temperature of 5° C. to 70° C. above the glass transition temperature. Furthermore, the COC described may contain polymerized units of cyclic olefins other than norbornene derivatives.

One of the problem of the copolymerization of cycloolefins (COC) such as norbornene, it is that said kind of monomer are difficult to incorporate in the polymer chain, i.e. that the reactivity ratio of COC vs other monomers is very low. This means that it is necessary to use large amounts of COC in order to obtain a limited concentration of COC derived units in the polymer chain.

Thus the applicant surprisingly found that it is possible to incorporate a large amount of COC when chromium based catalysts are used.

An object of the present invention is a process for polymerizing ethylene, alpha olefins of formula $CH_2=CHA$ wherein A is a $C_1$-$C_{20}$ alkyl radical, and one or more cycloolefins comprising the step of contacting under polymerization conditions ethylene, one or more alpha olefins of formula $CH_2=CHA$ and one or more cycloolefins in the presence of a catalyst system obtainable by contacting:

a) a compound of formula (I)

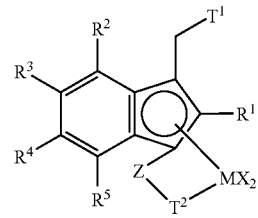

Wherein:

M is chromium;

X, equal to or different from each other, is a hydrogen atom, a halogen atom, a R, OR, $OSO_2CF_3$, OCOR, SR, $NR_2$ or $PR_2$ group wherein R is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical; optionally containing heteroatoms belonging to groups 13-17 of the Periodic Table of the Elements; or two X groups can be joined together to form a group OR'O wherein R' is a $C_1$-$C_{20}$-alkylidene, $C_6$-$C_{20}$-arylidene, $C_7$-$C_{20}$-alkylarylidene, or $C_7$-$C_{20}$-arylalkylidene radical; preferably X is a hydrogen atom, a halogen atom or R group; more preferably X is chlorine or a methyl radical;

Z is a divalent bridging group selected from $C_1$-$C_{20}$ alkylidene, $C_3$-$C_{20}$ cycloalkylidene, $C_6$-$C_{20}$ arylidene, $C_7$-$C_{20}$ alkylarylidene, or a $C_7$-$C_{20}$ arylalkylidene radicals, optionally containing heteroatoms belonging to groups 13-17 of the Periodic Table of the Elements, or it is a silylidene radical containing up to 5 silicon atoms; Z can also be an aliphatic or aromatic 5-7 membered ring condensed with $T^2$ to form for example with $T^2$ a quinoline moiety; preferably the ring is a $C_6$ ring;

$R^1$, $R^2$, $R^3$, $R^4$ and $R^5$, equal to or different from each other, are hydrogen atoms or $C_1$-$C_{40}$ hydrocarbon radical optionally containing silicon atoms, germanium atoms or heteroatoms belonging to groups 15-16 of the Periodic Table of the Elements or two groups among $R^1$, $R^2$, $R^3$, $R^4$ and $R^5$ can also be joined to form a from 4 to 7 membered ring, preferably a 5-6 membered ring that can be aliphatic or aromatic and can contain silicon atoms, Germanium atoms or heteroatoms belonging to groups 15-16 of the Periodic Table of the Elements; said ring can contain one or more $C_1$-$C_{10}$ hydrocarbon radicals as substituents; preferably $R^1$, $R^2$, $R^3$, $R^4$ and $R^5$ are hydrogen atoms, or linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl or $C_7$-$C_{20}$-arylalkyl radicals, optionally containing heteroatoms belonging to groups 13-17 of the Periodic Table of the Elements; or two groups among $R^1$, $R^2$, $R^3$, $R^4$ and $R^5$ can also be joined to form a from 4 to 7 membered ring, preferably a 5-6 membered ring that can be aliphatic or aromatic and can contain silicon atoms, Germanium atoms or heteroatoms belonging to groups 15-16 of the Periodic Table of the Elements; said ring can contain one or more $C_1$-$C_{10}$ hydrocarbon radicals as substituents;

$T^1$ is a $C_6$-$C_{20}$-aryl radical that can be substituted with one or more $C_1$ $C_{20}$ hydrocarbon radicals optionally containing heteroatoms belonging to groups 13-17 of the Periodic Table of the Elements.

$T^2$ is a radical comprising at least one uncharged donor containing at least one atom of group 15 or 16 of the Periodic Table b) an alumoxane or a compound capable of forming an alkyl cromocene cation; and optionally c) an organo aluminum compound.

In the compound of formula (I) $R^1$ is preferably a $C_1$-$C_{20}$-alkyl radical.

$R^2$ and $R^5$ are preferably hydrogen atoms.

$R^3$ and $R^4$ are preferably hydrogen atoms or they can be joined to form a from 4 to 7 membered ring, preferably a 5-6 membered ring that can be aliphatic or aromatic and can contain silicon atoms, Germanium atoms or heteroatoms belonging to groups 15-16 of the Periodic Table of the Elements; said ring can contain one or more $C_1$-$C_{10}$ hydrocarbon radicals as substituents.

$T^1$ is preferably a phenyl radical or a naphtyl radical that can be can be substituted with one or more $C_1$ $C_{20}$ hydrocarbon radicals optionally containing heteroatoms belonging to groups 13-17 of the Periodic Table of the Elements.

Z is preferably a $Si(R^6)_2$ group, a $C(R^6)_2$ or a $C(R^6)_2$—$C(R^6)_2$ group, wherein $R^6$, equal to or different from each other are hydrogen atoms, or linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl or $C_7$-$C_{20}$-arylalkyl radicals, optionally containing heteroatoms belonging to groups 13-17 of the Periodic Table of the Elements; or two $R^6$ can also be joined to form a from 4 to 7 membered ring.

$T^2$ is preferably a radical containing at least one heteroatom belonging to groups 15 or 16 of the periodic table, preferably $T^2$ contains sulphur phosphorous, oxygen or nitrogen atoms; more preferably $T^2$ has formula (IIa or (IIb);

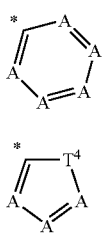

(IIa)

(IIb)

Wherein the asterisk (*) marks the position in which the bridge Z is bound; when the bridge Z is a condensed saturated or unsaturated ring the other position in which Z is bound si the position vicinal to the position marked with the asterisk (*); A is a $C(R^7)$ group or a $T^3$ atom, wherein $R^7$ equal to or different from each other, are hydrogen atoms or linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl or $C_7$-$C_{20}$-arylalkyl radicals, optionally containing heteroatoms belonging to groups 13-17 of the Periodic Table of the Elements; or two $R^7$ can also be joined to form a from 4 to 7 membered ring; $T^3$ is a nitrogen or a phosphorous atom, preferably a nitrogen atom; $T^4$ is sulphur, oxygen, or a $NR^7$ group; with the proviso that non more than two A groups are $T^3$ groups; preferably in formula (IIa) only one A group is a T3 group and In formula (IIb) all A groups are $C(R^7)$.

Preferred compounds of formula (I) have formulas (Ma) and (IIIb)

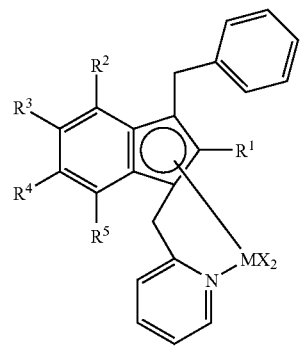

(IIIa)

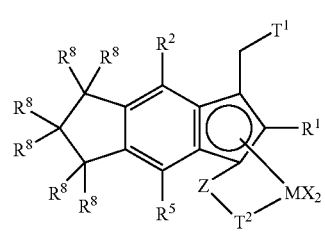

(IIIb)

Wherein

M, X, $R^1$, $R^2$, $R^3$, $R^4$, $R^5$ $T^2$ and $T^1$ have been described above; $R^8$ equal to or different from each other are hydrogen atoms or are hydrogen atoms or linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl or $C_7$-$C_{20}$-arylalkyl radicals, optionally containing heteroatoms belonging to groups 13-17 of the Periodic Table of the Elements; preferably $R^8$ are hydrogen atoms or $C_1$-$C_{20}$-alkyl radicals.

Cycloolefins according to the invention, are cyclic monomers containing are at least one polymerizable double bond.

In the preferred embodiment of the present invention, the cycloolefins have general formula (IV)

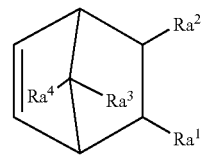

(IV)

wherein $R^1$, $R^2$, $R^3$ and $R^4$, independently from one another, are hydrogen atoms, $C_1$-$C_{20}$ alkyl, $C_3$-$C_{12}$ cycloalkyl or $C_6$-$C_{18}$ aryl; preferably hydrogen atoms, $C_1$-$C_8$ alkyl, $C_3$-$C_8$ cycloalkyl or $C_6$-$C_{12}$ aryl, or two of $R^1$, $R^2$, $R^3$ and $R^4$, together with the carbon atom(s) to which they are bound form one or more saturated, partially unsaturated or aromatic rings that can bears $C_1$-$C_{20}$ hydrocarbon substituents, In a more particularly preferred embodiment, the cycloolefin is one of the formulae (IVa), (IVb), (IVc) (IVd) or (IVf)

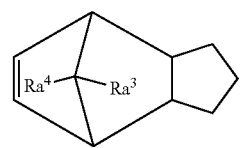

(IVa)

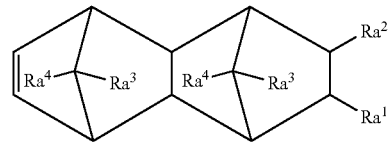
(IVb)

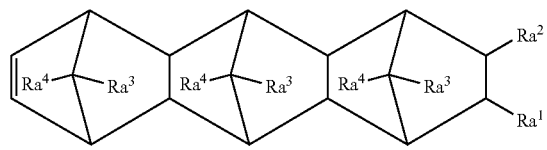
(IVc)

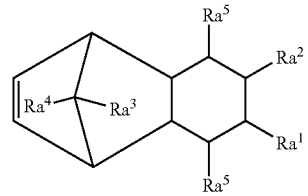
(IVd)

wherein Ra⁵ is defined as $Ra^1$ and $Ra^2$.

Examples of cycloolefin are norbornene, cyclopentene, cyclohexene, cycloheptene, cyclopentadiene, cyclohexadiene, cycloheptadiene Norbornadiene.

Non limitative examples of alpha-olefins of formula $CH_2=CHA$ are: propylene, 1-butene, 1-hexene, 1-octene and 4-methyl-1-pentene, preferred alpha olefins are 1-butene and 1-hexene.

In the terpolymer of the present invention the ethylene derived units content range from 90% to 50% by weight; the derived units of alpha olefin of formula $CH_2=CHA$ range from 5% to 40% by weight and the content of cycloolefin derived units range from 2% to 30% by weight; preferably the ethylene derived units range from 90% by weight to 70% by weight, the derived units of alpha olefin of formula $CH_2=CHA$ range from 5% to 20% by weight, and the content of cycloolefin derived units range from 5% to 10% by weight.

Alumoxanes used as component b) in the catalyst system according to the present invention can be obtained by reacting water with an organo-aluminium compound of formula $H_jAlU_{3-j}$ or $H_jAl_2U_{6-j}$, where the U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number. In this reaction the molar ratio of Al/water is preferably comprised between 1:1 and 100:1.

The alumoxanes used in the catalyst system according to the invention are considered to be linear, branched or cyclic compounds containing at least one group of the type:

wherein the substituents U, same or different, are defined above.

In particular, alumoxanes of the formula:

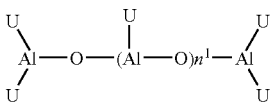

can be used in the case of linear compounds, wherein $n^1$ is 0 or an integer of from 1 to 40 and the substituents U are defined as above; or alumoxanes of the formula:

can be used in the case of cyclic compounds, wherein $n^2$ is an integer from 2 to 40 and the U substituents are defined as above.

Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO).

Particularly interesting cocatalysts are those described in WO 99/21899 and in WO01/21674 in which the alkyl and aryl groups have specific branched patterns.

Non-limiting examples of aluminium compounds that can be reacted with water to give suitable alumoxanes (b), described in WO 99/21899 and WO01/21674, are: tris(2,3,3-trimethyl-butyl)aluminium, tris(2,3-dimethyl-hexyl)aluminium, tris(2,3-dimethyl-butyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl)aluminium, tris(2-ethyl-3-methyl-butyl)aluminium, tris(2-ethyl-3-methyl-pentyl)aluminium, tris(2,3-diethyl-pentyl)aluminium, tris(2-propyl-3-methyl-butyl)aluminium, tris(2-isopropyl-3-methyl-butyl)aluminium, tris(2-isobutyl-3-methyl-pentyl)aluminium, tris(2,3,3-trimethyl-pentyl)aluminium, tris(2,3,3-trimethyl-hexyl)aluminium, tris(2-ethyl-3,3-dimethyl-butyl)aluminium, tris(2-ethyl-3,3-dimethyl-pentyl)aluminium, tris(2-isopropyl-3,3-dimethyl-butyl)aluminium, tris(2-trimethylsilyl-propyl)aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluorophenyl)-propyl]aluminium, tris[2-(4-chloro-phenyl)-propyl]aluminium, tris[2-(3-isopropyl-phenyl)-propyl]aluminium, tris(2-phenyl-butyl)aluminium, tris(3-methyl-2-phenyl-butyl)aluminium, tris(2-phenyl-pentyl)aluminium, tris[2-(pentafluorophenyl)-propyl]aluminium, tris[2,2-diphenyl-ethyl]aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Amongst the above aluminium compounds, trimethylaluminium (TMA), triisobutylaluminium (TIBA), tris(2,4,4-trimethyl-pentyl)aluminium (TIOA), tris(2,3-dimethylbutyl) aluminium (TDMBA) and tris(2,3,3-trimethylbutyl) aluminium (TTMBA) are preferred.

Non-limiting examples of compounds able to form an alkyl cromocene cation are compounds of formula $D^+E^-$, wherein $D^+$ is a Brønsted acid, able to donate a proton and to react irreversibly with a substituent X of the cromocene of formula (I) and $E^-$ is a compatible anion, which is able to stabilize the active catalytic species originating from the reaction of the two compounds, and which is sufficiently labile to be removed by an olefinic monomer. Preferably, the anion $E^-$ comprises one or more boron atoms. More preferably, the anion $E^-$ is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred compound, as described in WO 91/02012. Moreover, compounds of formula $BAr_3$ can be conveniently used. Compounds of this type are described, for example, in the International patent application WO 92/00333. Other examples of compounds able to form an alkyl cromocene cation are compounds of formula $BAr_3P$ wherein P is a substituted or unsubstituted pyrrol radical. These compounds are described in WO01/62764. Compounds containing boron atoms can be conveniently supported according to the description of DE-A-19962814 and DE-A-19962910. All these compounds containing boron atoms can be used in a molar ratio between boron and the metal of the cromocene comprised between about 1:1 and about 10:1; preferably 1:1 and 2.1; more preferably about 1:1.

Non limiting examples of compounds of formula $D^+E^-$ are:
Triethylammoniumtetra(phenyl)borate,
Tributylammoniumtetra(phenyl)borate,
Trimethylammoniumtetra(tolyl)borate,
Tributylammoniumtetra(tolyl)borate,
Tributylammoniumtetra(pentafluorophenyl)borate,
Tributylammoniumtetra(pentafluorophenyl)aluminate,
Tripropylammoniumtetra(dimethylphenyl)borate,
Tributylammoniumtetra(trifluoromethylphenyl)borate,
Tributylammoniumtetra(4-fluorophenyl)borate,
N,N-Dimethylbenzylammonium-tetrakispentafluorophenylborate,
N,N-Dimethylhexylammonium-tetrakispentafluorophenylborate,
N,N-Dimethylaniliniumtetra(phenyl)borate,
N,N-Diethylaniliniumtetra(phenyl)borate,
N,N-Dimethylaniliniumtetrakis(pentafluorophenyl)borate,
N,N-Dimethylaniliniumtetrakis(pentafluorophenyl)aluminate,
N,N-Dimethylbenzylammonium-tetrakispentafluorophenylborate,
N,N-Dimethylhexylammonium-tetrakispentafluorophenylborate,
Di(propyl)ammoniumtetrakis(pentafluorophenyl)borate,
Di(cyclohexyl)ammoniumtetrakis(pentafluorophenyl)borate,
Triphenylphosphoniumtetrakis(phenyl)borate,
Triethylphosphoniumtetrakis(phenyl)borate,
Diphenylphosphoniumtetrakis(phenyl)borate,
Tri(methylphenyl)phosphoniumtetrakis(phenyl)borate,
Tri(dimethylphenyl)phosphoniumtetrakis(phenyl)borate,
Triphenylcarbeniumtetrakis(pentafluorophenyl)borate,
Triphenylcarbeniumtetrakis(pentafluorophenyl)aluminate,
Triphenylcarbeniumtetrakis(phenyl)aluminate,
Ferroceniumtetrakis(pentafluorophenyl)borate,
Ferroceniumtetrakis(pentafluorophenyl)aluminate.
Triphenylcarbeniumtetrakis(pentafluorophenyl)borate, and
N,N-Dimethylaniliniumtetrakis(pentafluorophenyl)borate.

Organic aluminum compounds used as compound c) are those of formula $H_jAlU_{3-j}$ or $H_jAl_2U_{6-j}$ as described above.

The catalysts of the present invention can also be supported on an inert carrier. This is achieved by depositing the cromocene compound a) or the product of the reaction thereof with the component b), or the component b) and then the cromocene compound a) on an inert support. The support can be a porous solid such as talc, a sheet silicate, an inorganic oxide or a finely divided polymer powder (e.g. polyolefin). Suitable inorganic oxides may be found among the oxides of elements of groups 2, 3, 4, 5, 13, 14, 15 and 16 of the Periodic Table of the Elements. Examples of oxides preferred as supports include silicon dioxide, aluminum oxide, and also mixed oxides of the elements calcium, aluminum, silicon, magnesium or titanium and also corresponding oxide mixtures, magnesium halides, styrene/divinylbenzene copolymers, polyethylene or polypropylene. Other inorganic oxides which can be used alone or in combination with the above-mentioned preferred oxidic supports are, for example, MgO, $ZrO_2$, $TiO_2$ or $B_2O_3$.

A suitable class of supports which can be used is that constituted by porous organic supports functionalized with groups having active hydrogen atoms. Particularly suitable are those in which the organic support is a partially crosslinked styrene polymer. Supports of this type are described in European application EP-633 272.

Another class of inert supports particularly suitable for use according to the invention is that of polyolefin porous prepolymers, particularly polyethylene.

A further suitable class of inert supports for use according to the invention is that of porous magnesium halides such as those described in International application WO 95/32995.

The support materials used preferably have a specific surface area in the range from 10 to 1 000 $m^2/g$, a pore volume in the range from 0.1 to 5 ml/g and a mean particle size of from 1 to 500 µm. Preference is given to supports having a specific surface area in the range from 50 to 500 $m^2/g$, a pore volume in the range from 0.5 to 3.5 ml/g and a mean particle size in the range from 5 to 350 µm. Particular preference is given to supports having a specific surface area in the range from 200 to 400 $m^2/g$, a pore volume in the range from 0.8 to 3.0 ml/g and a mean particle size of from 10 to 300 µm.

The inorganic support can be subjected to a thermal treatment, e.g. to remove adsorbed water. Such a drying treatment is generally carried out at from 80 to 300° C., preferably from 100 to 200° C., with drying at from 100 to 200° C. preferably being carried out under reduced pressure and/or a blanket of inert gas (e.g. nitrogen), or the inorganic support can be calcined at from 200 to 1000° C. to produce the desired structure of the solid and/or set the desired OH concentration on the surface. The support can also be treated chemically using customary desiccants such as metal alkyls, preferably aluminum alkyls, chlorosilanes or $SiCl_4$, or else methylaluminoxane. Appropriate treatment methods are described, for example, in WO 00/31090.

The inorganic support material can also be chemically modified. For example, treatment of silica gel with $(NH_4)_2SiF_6$ leads to fluorination of the silica gel surface, or treatment of silica gels with silanes containing nitrogen-, fluorine- or sulfur-containing groups leads to correspondingly modified silica gel surfaces.

Organic support materials such as finely divided polyolefin powders (e.g. polyethylene, polypropylene or polystyrene) can also be used and are preferably likewise freed of adhering moisture, solvent residues or other impurities by means of appropriate purification and drying operations before use. It is also possible to use functionalized polymer supports, e.g. supports based on polystyrene, via whose functional groups, for example ammonium or hydroxy groups, at least one of the catalyst components can be immobilized. The solid compound obtained by supporting the catalyst system object of the present invention on a carrier in combination with the further addition of the alkylaluminium compound either as such or prereacted with water if necessary, can be usefully employed in the gas-phase or slurry polymerization.

The process for the polymerization of olefins according to the invention can be carried out in the liquid phase in the presence or absence of an inert hydrocarbon solvent, such as in slurry, or in the gas phase. The hydrocarbon solvent can either be aromatic such as toluene, or aliphatic such as propane, hexane, heptane, isobutane or cyclohexane.

The polymerization temperature is generally comprised between −100° C. and +200° C. and, particularly between 10° C. and +100° C. The polymerization pressure is generally comprised between 0.5 and 100 bar.

The lower the polymerization temperature, the higher are the resulting molecular weights of the polymers obtained.

A further object of the present invention is a terpolymer containing:
a) from 90% to 50% by weight; preferably from 90% to 70% by weight of ethylene derived units;
b) from 5% to 40% by weight; preferably from 5% to 20% by weight of derived units of alpha olefin of formula $CH_2=CHA$ wherein A is a $C_1$-$C_{20}$ alkyl radical;
c) from 2% to 30% by weight, preferably from 5% to 20% by weight of cycloolefins derived units.

Said terpolymer being characterized by the following features
i) distribution of molecular weight Mw/Mn lower than 3.5; preferably lower than 3; more preferably lower than 2.7
ii) solubility in xylene at 25° C. higher than 99%
iii) the melting point (Tm2) of the polymer fulfils the following relation:

$$Tm2 < -2.7C + 104; \text{ preferably } Tm2 < -2.7C + 102$$

Wherein C is the sum of the concentrations of alpha olefins and cycloolefins given by weight; and
iv) the glass transition temperature (Tg) of the polymer fulfils the following relation:

$$Tg > -3.3(C_4 * 0.34 + C_c * 0.71) + 19$$

Wherein $C_4$ is the concentration of alpha olefins and $C_c$ is the concentration of cycloolefins given by weight.

Preferably the relation of point iv) is $Tg > -3.3(C_4*0.34+C_c*0.71)+25$; even more preferably $Tg > -3.3(C_4*0.34+C_c*0.71)+30$.

The copolymer object of the present invention shows a lower melting point and an higher glass transition temperature (Tg) of its analogous wherein all the comonomers are represented only by the alpha olefins.

Non limitative examples of alpha-olefins of formula $CH_2=CHA$ are: propylene, 1-butene, 1-hexene, 1-octene and 4-methyl-1-pentene, preferred alpha olefins are 1-butene and 1-hexene.

A further object of the present invention is a process for polymerizing ethylene and one or more cycloolefins comprising the step of contacting under polymerization conditions ethylene and one or more cycloolefins in the presence of a catalyst system obtainable by contacting:
a) a compound of formula (I)
b) an alumoxane or a compound capable of forming an alkyl cromocene cation; and optionally
c) an organo aluminum compound.
Wherein the compound of formula (I), the alumoxane, a compound capable of forming an alkyl cromocene cation and the organoaluminum compound have been described above.

With the above process it is possible to prepare a copolymer of ethylene and one or more cycloolefin endowed with the following features:
a) Melt Flow Rate (MFR) measured according to ASTM D1238 condition E ranging from 0.1-50;
b) a density ranging from 0.860 to 0.970 g/cm³ (ASTM D 1505);
c) a content of cycloolefins derived units ranging from 2% to 30% by weight, preferably from 5% to 20% by weight.

The above ethylene copolymer can be advantageously used in blend with a polyolefin. The resulting blend contains from 5% to 95% by weight of the ethylene polymer of the present invention. Preferred polyolefins are propylene, ethylene 1-butene based polymer, such as polypropylene homo and copolymer, preferably propylene-ethylene copolymers, polyethylene homo and copolymer, preferably ethylene, 1-butene or ethylene-1 hexene or ethylene-1-ottene copolymer; 1-butene homo and copolymer, preferably 1-butene-ethylene, 1-butene-propylene copolymers.

The ethylene terpolymer and the ethylene copolymer of the present invention can be advantageously used alone or in blend with other polyolefins for the production of molded articles, films, preferably blow films and fibers The following examples are given to illustrate and not to limit the invention.

EXAMPLES

Intrinsic viscosity η, which is the value of the viscosity number by extrapolation of polymer concentration to zero, was determined on an automatic Ubbelohde viskometer (Lauda PVS 1) at a concentration of 0.001 g/ml in decaline as a solvent and at a temperature of 135° C. according to EN ISO 1628-1:1998.

The determination of the molar mass distributions and the means Mn, Mw and Mw/Mn derived therefrom was carried out by means of high-temperature gel permeation chromatography using a method based on DIN 55672-1 on a WATERS 150 C equipped with the following columns connected in series: 3× SHODEX AT 806 MS, 1× SHODEX UT 807 and 1× SHODEX AT-G under the following conditions: solvent: 1,2,4-trichlorobenzene (stabilized with 0.025% by weight of 2,6-di-tert-butyl-4-methylphenol), flow: 1 ml/min, 500 µl injection volume, temperature: 135° C., calibration using PE standards. Evaluation was carried out using WIN-GPC (HS-Entwicklungsgesellschaft für wissenschaftliche Hard-und Software mbH, Ober-Hilbersheim).

The ¹H-NMR spectra were measured on a Bruker DRX 200 (¹H, 200.13 MHz). In ¹H-NMR spectra, the signal of the incompletely deuterated part of the solvent used served as internal standard. All signals were calibrated to the appropriate literature values.

The glass transition temperature was determined by Dynamic Mechanical Thermal Analysis (DMTA) in accordance with DIN EN ISO 6721-2, 1996. The material taken from polymerization was pressed in a sheet of 70 mm×40 mm×1 mm under 20-30 bar pressure during melting until reaching a stable temperature of 200° C. for 1 min. After this temperature is reached, the material was pressed for 4 min under 100 bar and afterwards cooled with 15 K/min. After cooling, test specimens of dimensions 12.5 mm×40 mm×1 mm were stamped from the sheet. In an oscillation measurement in torsion mode with 1 Hz excitation frequency and a strain amplitude lower than 0.04%, a temperature range of at least −100° C. to +110° C. is covered, using a heating rate of 1K/min. Tg is determined from the maximum of the loss modulus G" peak.

The melting point of the polymers were measured by Differential Scanning Calorimetry (D.S.C.) on a heat flow DSC (TA-Instruments Q2000), according to the standard method (ISO 11357-3 (1999)). A weighted sample (5-6 mg) obtained from the polymerization was sealed into aluminum pans and heated to 200° C. at 20 K/minute. The sample was kept at 200° C. for 5 minutes to allow a complete melting of all the crystallites, then cooled to −10° C. at 20° C./minute. After standing 2 minutes at −10° C., the sample was heated for the second time to 200° C. at 20 K/min. In this second heating run the area of the peak was taken as enthalpy of fusion (ΔHf) and the maximum of the peak was taken as the melting point (Tm2).

The solubility in xylene at 25° C. was determined according to the following method: About 2.5 g of polymer and 250 ml of o-xylene were placed in a round-bottomed flask provided with cooler and a reflux condenser and kept under nitrogen. The mixture obtained was heated to 135.degree. C. and was kept under stirring for about 60 minutes. The final solution was allowed to cool to 25.degree. C. under continuous stirring, and was then filtered. The filtrate was then evaporated in a nitrogen flow at 140° C. to reach a constant weight. The content of said xylene-soluble fraction is expressed as a percentage of the original 2.5 grams.

Synthesis of [η$^5$-1-(2-methylpyridine)-2-methyl-3-benzyl-1H-inden-1-yl]dichlorochromium (A-1)

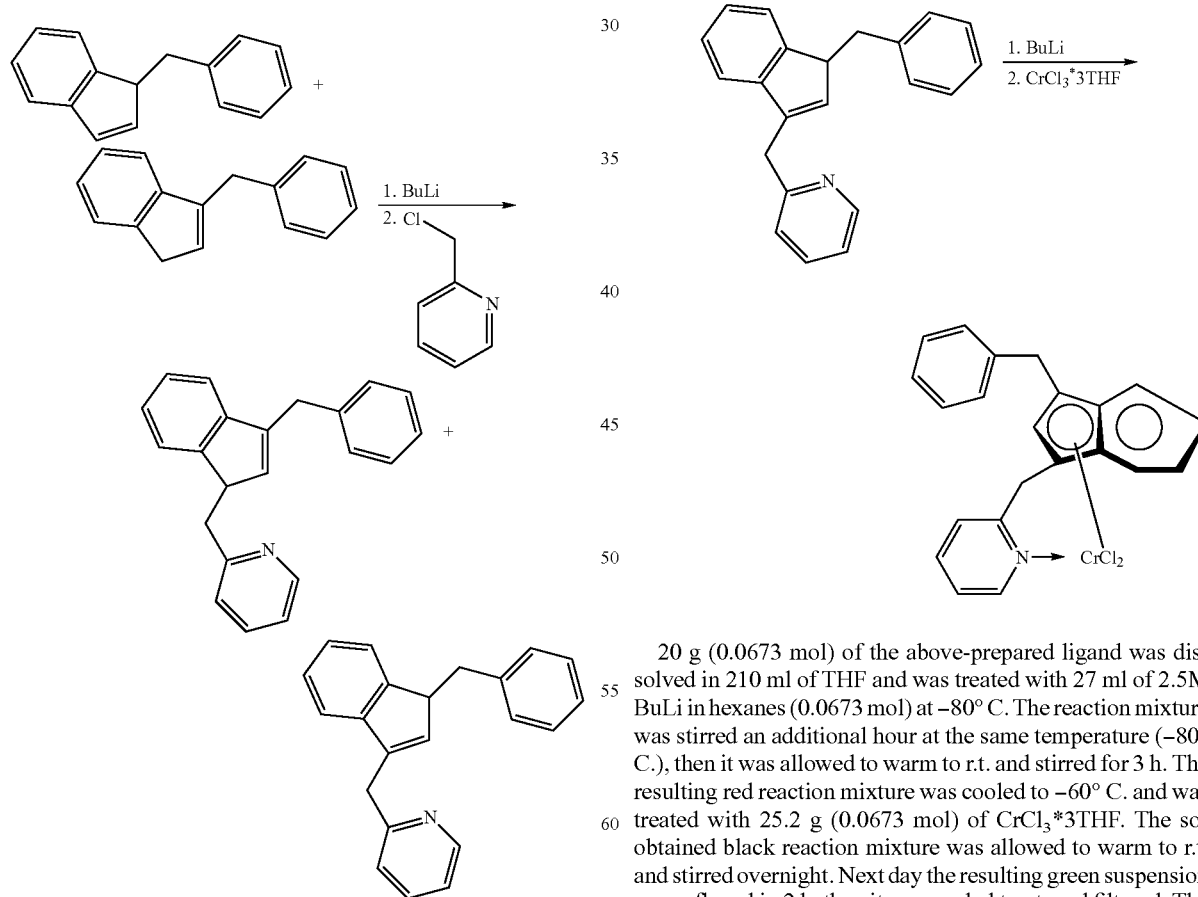

15 g (0.0727 mol) of the benzylindene (mixture of isomers) was dissolved in 150 ml Et$_2$O and treated with 29 ml 2.5M BuLi (0.0727 mol) in hexanes at −60° C. After the deprotonation was complete the lithium salt was treated with 9.27 g (0.0727 mol) 2-(chloromethyl)pyridine dissolved in 30 ml of benzene. The mixture was allowed to warm and stirred overnight. Next day the resulting mixture was treated with 50 ml of water, the organic phase was collected, dried with MgSO$_4$ and evaporated to give 20 g (93%) of the product as a mixture of isomers. This substance was used without further purification.

NMR $^1$H(CDCl$_3$): 8.65 (m, 1H); 7.62 (dt, 1H); 7.36-7.02 (group of signals, 11H); 6.18 (br.s, 1H); 4.07 (m, 1H); 3.92 (br.s, 2H); 3.29 (dd, 1H); 2.98 (dd, 1H).

8.60 (m, 1H); 7.54 (dt, 1H); 7.36-7.02 (group of signals, 11H); 6.25 (br.s, 1H); 4.12 (br.s, 2H); 3.80 (m, 1H); 3.16 (m, 1H); 2.87 (dd, 1H).

20 g (0.0673 mol) of the above-prepared ligand was dissolved in 210 ml of THF and was treated with 27 ml of 2.5M BuLi in hexanes (0.0673 mol) at −80° C. The reaction mixture was stirred an additional hour at the same temperature (−80° C.), then it was allowed to warm to r.t. and stirred for 3 h. The resulting red reaction mixture was cooled to −60° C. and was treated with 25.2 g (0.0673 mol) of CrCl$_3$*3THF. The so-obtained black reaction mixture was allowed to warm to r.t. and stirred overnight. Next day the resulting green suspension was refluxed in 2 h, then it was cooled to r.t. and filtered. The green solid was washed 2 times with THF, 3 times with ether and dried to give 13 g (46%) of the crude product. 8 g of the crude product was dissolved in 100 ml of CH2Cl2 and filtered. The resulting green solution was evaporated up to the

Synthesis of [η⁵-1-(2-methylpyridine)-2-methyl-3-benzyl-1,5,6,7-tetrahydro-s-indacen-1-yl]dichlorochromium (A-2)

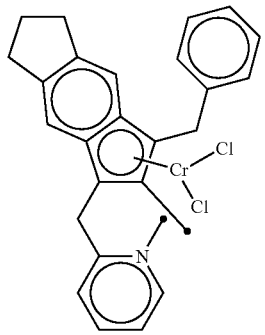

2-methyl-3,5,6,7-tetrahydro-s-indacen-1(2H)-one

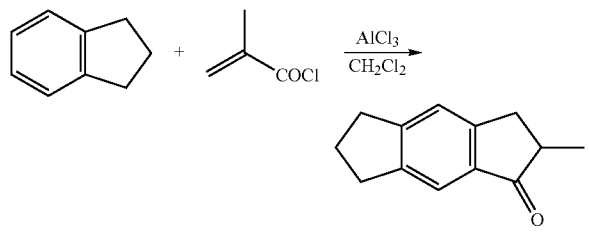

Methacryloyl chloride (50 ml, 0.5 mol) was added to suspension of 133.5 r AlCl₃ (1 mol) in 500 ml CH₂Cl₂ at −78° C., stirred 20 min. Then indane (59 g, 0.5 mol) was added at the same temperature, allowed to warm to room temperature and then was stirred overnight. Next day the mixture obtained was poured carefully into mixture of ice (1000 g) and HCl (200 ml). The organic phase was separated, washed by water, 5% NaHCO₃, and dried over MgSO₄. Solvent was evaporated and residue was distilled in vacuum given 77.6 of product (83%), b.p. 118-120° C./0.5 torr.

NMR ¹H(CDCl₃): 7.59 (s, 1H); 7.28 (s, 1H); 3.34 (dd, 1H); 2.92 (m, 4H); 2.80-2.65 (group of signals, 2H); 2.13 (m, 2H); 1.42 (d, 3H).

¹³C 208.90, 152.82, 152.45, 143.96, 134.91, 121.85, 199.00, 42.25, 34.52, 32.90, 31.85, 25.61, 16.33

6-methyl-1,2,3,5-tetrahydro-s-indacene

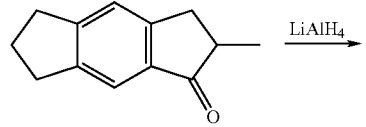

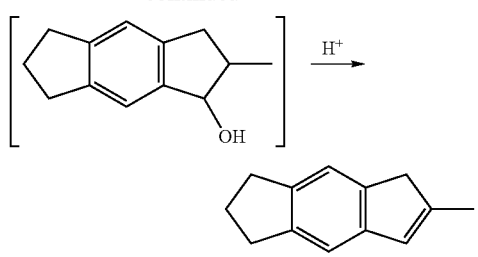

3.8 g (0.1 mol) of LiAlH₄ was carefully added under cooling (0° C.) and stirring to the solution of 37.2 g (0.2 mol) of 2-methyl-3,5,6,7-tetrahydro-s-indacen-1(2H)-one in 300 ml of Et₂O. The resulting mixture was allowed to warm to room temperature and then was stirred overnight. Next day the mixture obtained was cooled to 0° C. and 10% HCl was carefully added. The organic phase was separated, dried over MgSO₄. The 0.5 g of TSA was then added and the reaction mixture was refluxed in 1 h. After that it was washed by water solution of NaHCO₃ and saturated water solution of NaCl. The organic phase was dried over MgSO₄, evaporated and then isolated by distillation to give 28.5 g of the product (83%). B.p. 140° C./5 torr.

NMR ¹H (CDCl₃): 7.34 (s, 1H); 7.24 (s, 1H); 6.56 (s, 1H); 3.34 (s, 2H); 3.05 (m, 4H); 2.30-2.20 (group of signals, 5H).

2-[(3-benzyl-2-methyl-1,5,6,7-tetrahydro-s-indacen-1-yl)methyl]pyridine and 2-[(3-benzyl-2-methyl-3,5,6,7-tetrahydro-s-indacen-1-yl)methyl]pyridine

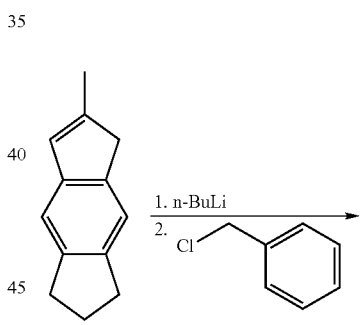

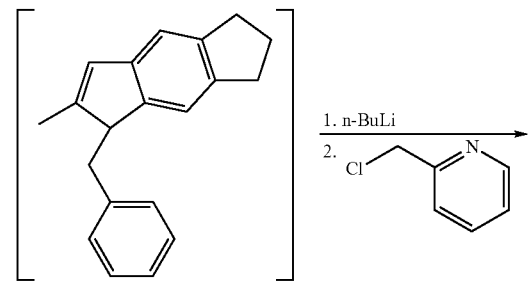

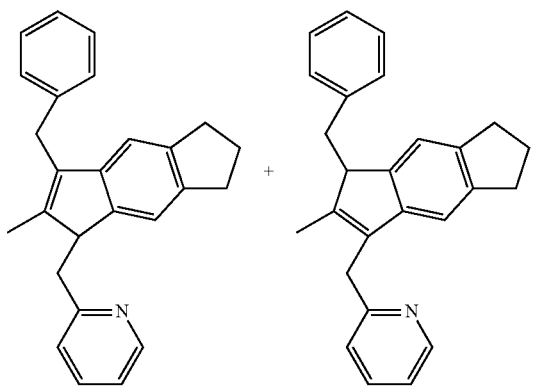

6-methyl-1,2,3,5-tetrahydro-s-indacene (17.2 g, 0.1 mol) and Et$_2$O (180 ml) were placed into 500 ml bulb. This solution was cooled to −20° C. and 2.5M n-butyllithium in hexane (40 ml. 0.1 mol) was added in 20 min with stirring. The cooling was removed and the reaction mixture allowed to stir for 4 h. Then the it was cooled again (−20° C.) and treated with the solution of (chloromethyl)benzene (11.5 ml 0.1 mol) in 30 ml of Et$_2$O. The resulting mixture was allowed to warm to room temperature and then was stirred overnight. Next day the mixture obtained was cooled to −20° C. and 2.5M n-butyllithium in hexane (40 ml. 0.1 mol) was added in 20 min with stirring. The cooling was removed and the reaction mixture was allowed to stir for 4 h. Then it was cooled again (−0° C.) and treated with the solution of 2-(chloromethyl)pyridine (12.7 g, 0.1 mol) in 20 ml of benzene. The resulting mixture was allowed to warm to room temperature and then was stirred overnight. Next day it was treated with 80 ml of water. The organic layer was isolated; the aqueous one was extracted with Et$_2$O (2*40 ml). The organic phase was dried over MgSO$_4$ and evaporated. The residue was redissolved in toluene and solution obtained was evaporated again to give quantitative amount of the desirable compound as a mixture of the isomers. This substance was used in the next step without purification.

A-2

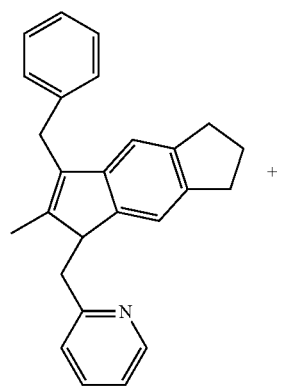

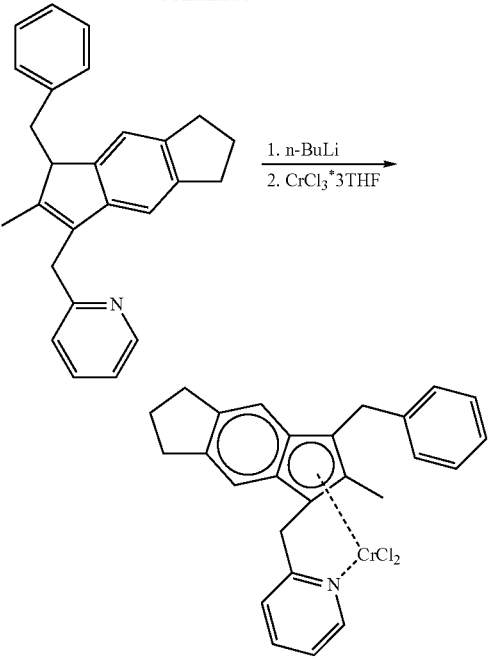

The mixture of isomers prepared in previous step was dissolved in 150 ml of THF. Resulting solution was cooled to −70° C. and was treated with 2.5M n-butyllithium in hexane (38 ml. 0.095 mol) in 20 min under stirring. The resulting mixture was stirred at the same temperature for additional 1 h and then it was allowed to warm up to r.t. and stirred 3 h. Then the mixture was cooled again to −60° C. and was treated with 35.5 g (0.095 mol) of CrCl$_3$*3THF. The resulting mixture was allowed to warm to r.t. and then was stirred overnight. Next day the reaction mixture was refluxed within 1 h then it was cooled to −10 C and finally it was filtered to give the green precipitate. This precipitate was washed with 50 ml of cold THF, then with 100 ml of ether and then was dried to give 26.3 g of the crude product (~50% from the indene). 13 g of the crude product was dissolved in 100 ml of CH$_2$Cl$_2$, then the half of the solvent was evaporated and the resulting solution was treated with 50 ml of the pentane. The resulting suspension was filtered (to get free from thin white precipitate) and the resulting solution was evaporated to give green crystalline solid. This solid was washed with 100 ml of the CH$_2$Cl$_2$/pentane and dried. 8 g of the product (A-2) was isolated. From the mother solution 1-2 g more of the compound can be isolated.

Comparative Polymerization Example 1

Preparation of the Catalytic Solution

A solution of 36.4 mg of A-1 in 15 ml cyclohexane, 10.6 ml Tibal (20% in cyclohexane from Chemtura) and 3.7 ml PMAO (7% solution, from Akzo Nobel) were mixed.

The obtained suspension was stirred for 15 minutes at room temperature.

The obtained suspension (29.3 ml) had black brown colour and the concentration was 2.96 μmol/ml.

Polymerization

A 3.1 L-Steelautoclave was filled under Argon at room temperature with 450 mL cyclohexane and 1300 mL butene.

The temperature was raised up to 80° C. (Speed frequency: 350). The recruit pressure was raised to 4.5 bar with 29.9 g ethylene.

4.2 g Triisopropylaluminium (TIBA in cyclohexane 20%) were added.

After 5 minutes of stirring catalyst solution (60 μmol of the solution) was added and the catalyst dosing unit was rinsed with 20 ml cyclohexane.

The adjusted pressure of 14 bar was kept constant for 103 minutes via adding additional ethylene (125.5 g) during the polymerisation.

After 103 minutes the polymerisation was stopped with 5 mL isopropanol and the autoclave was cooled down to 50° C. (Speed frequency 100).

The pressure was released and the autoclave was rinsed out with nitrogen.

750 mL Exxsol D 140/170 were added and the temperature was raised up to 50° C.

The polymer was dried in high vacuum by 80° C. for 12 hours.

Yield was 172.8 g, which was 6851 kg/mol Cr or 1677 kg PE/(mol Cr*h). The polymer features have been reported in table 1

Example 2

Preparation of the Catalytic Solution

A solution of 30.1 mg of A-1 in 10 ml cyclohexane, 8.7 ml Tibal (20% in cyclohexane from Chemtura) and 3.1 ml PMAO (7% solution, from Akzo Nobel) were mixed.

The obtained suspension was stirred for 15 minutes at room temperature.

The obtained suspension (21.8 ml) had red brown colour and the concentration was 3.29 μmol/ml.

Polymerization

A 3.1 L-Steelautoclave was filled under Argon at room temperature with 450 mL cyclohexane 100 mL of norbornen and 1300 mL butene. The temperature was raised up to 80° C. (Speed frequency: 350). The recruit pressure was raised to 4.5 bar with 26.5 g ethylene. 3.1 g Triisopropylaluminium (TIBAL in cyclohexane 20%) were added.

After 5 minutes of stirring catalyst solution (60.1 μmol of the solution) was added and the catalyst dosing unit was rinsed with 20 ml cyclohexane.

The adjusted pressure of 17 bar was kept constant for 124 minutes via adding additional ethylene (28.8 g) during the polymerisation.

After 124 minutes the polymerisation was stopped with 5 mL isopropanol and the autoclave was cooled down to 50° C. (Speed frequency 100).

The pressure was released and the autoclave was rinsed out with nitrogen.

750 mL Exxsol D 140/170 were added and the temperature was raised up to 50° C.

The polymer was dried in high vacuum by 80° C. for 12 hours. Yield was 44.7 g, which was 1769 kg/mol Cr or 360 kg PE/(mol Cr*h). The polymer features have been reported in table 1

Example 3

Preparation of the Catalytic Solution

A solution of 30.1 mg of A-1, in 20 ml cyclohexane, 8.7 ml Tibal (20% in cyclohexane from Chemtura) and 3.1 ml PMAO (7% solution, from Akzo Nobel) were mixed. The obtained suspension was stirred for 15 minutes at room temperature. The obtained suspension (21.8 ml) had red brown colour and the concentration was 3.29 μmol/ml.

Polymerization

A 3.1 L-Steelautoclave was filled under Argon at room temperature with 450 mL cyclohexane, 50 mL of norbornen and 1300 mL butene. The temperature was raised up to 80° C. (Speed frequency: 350). The recruit pressure was raised to 4.5 bar with 26.5 g ethylene. 3.1 g Triisopropylaluminium (TIBAl in cyclohexane 20%) were added. After 5 minutes of stirring catalyst solution (60.4 μmol of the solution) was added and the catalyst dosing unit was rinsed with 20 ml cyclohexane. The adjusted pressure of 18.2 bar was kept constant for 123 minutes via adding additional ethylene (60.4 g) during the polymerisation. After 123 minutes the polymerisation was stopped with 5 mL isopropanol and the autoclave was cooled down to 50° C. (Speed frequency 100). The pressure was released and the autoclave was rinsed out with nitrogen. 750 mL Exxsol D 140/170 were added and the temperature was raised up to 50° C.

The polymer was dried in high vacuum by 80° C. for 12 hours. Yield was 67.1 g, which was 2656 kg/mol Cr or 544 kg PE/(mol Cr*h). The polymer features have been reported in table 1

Example 4

Preparation of the Catalytic Solution

A solution of 34.2 mg of A-1, in 15 ml cyclohexane, 9.9 ml Tibal (20% in cyclohexane from Chemtura) and 3.5 ml PMAO (7% solution, from Akzo Nobel) were mixed. The obtained suspension was stirred for 15 minutes at room temperature. The obtained suspension (28.4 ml) had black brown colour and the concentration was 2.87 μmol/ml.

Polymerization

A 3.1 L-Steelautoclave was filled under Argon at room temperature with 450 mL cyclohexane, 30 mL of norbornen and 1300 mL butene. The temperature was raised up to 80° C. (Speed frequency: 350). The recruit pressure was raised to 4.5 bar with 20.5 g ethylene.

3.1 g Triisopropylaluminium (TIBAl in cyclohexane 20%) were added. After 5 minutes of stirring catalyst solution (59.9 μmol of the solution) was added and the catalyst dosing unit was rinsed with 20 ml cyclohexane. The adjusted pressure of 10.2 bar was kept constant for 123 minutes via adding additional ethylene (67.2 g) during the polymerisation. After 123 minutes the polymerisation was stopped with 5 mL isopropanol and the autoclave was cooled down to 50° C. (Speed frequency 100). The pressure was released and the autoclave was rinsed out with nitrogen. 750 mL Exxsol D 140/170 were added and the temperature was raised up to 50° C.

The polymer was dried in high vacuum by 80° C. for 12 hours. Yield was 80.6 g, which was 3203 kg/mol Cr or 657 kg PE/(mol Cr*h). The polymer features have been reported in table 1

Example 5

Preparation of the Catalytic Solution

A solution of 12.9 mg of A-2 in 3.3 ml-Triisopropylaluminium (20% in Cyclohexane) and 1.2 ml PMAO (7% solution, from Akzo Nobel) (which was separately mixed before). The proportionality was Cr:Al:Al=1:100:100. The obtained suspension was stirred for 5 minutes at room temperature.

The obtained suspension (4.5 ml) black brown colour and the concentration was 6.06 μmol/ml.

Polymerization

A 1 L-Steel autoclave was filled under Argon at room temperature with 450 mL Cyclohexane and 25 ml Norbornen. The autoclave was cooled down to 5° C. and was filled with 150 mL butene. The temperature was raised up to 80° C. (Speed frequency: 450). The recruit pressure was raised to 5 bar with 11.3 L ethylene. 500 mg Triisopropylaluminium (20% in Cyclohexane) were added.

After 5 minutes of stirring catalyst solution (10.0 μmol of the solution) was added and the catalyst dosing unit was rinsed with about 3 ml cyclohexane. The adjusted pressure of 8.55 bar was kept constant for 60 minutes via adding additional ethylene (13.7 L) during the polymerisation.

After 60 minutes the polymerisation was stopped with 5 mL of an isopropanol/Irganox 1010-solution and the autoclave was cooled down to 10° C. (Speed frequency 0).

The pressure was released down to 2 bar. 300 mL Exxsol D 140/170 were added and the temperature was raised up to 90° C. The polymer was dried in high vacuum by 80° C. for 12 hours. Yield was 25.5 g, which was 5391 g/g or 2552 kg PE/(mol Cr*h). The polymer features have been reported in table 1.

TABLE 1

| Ex. | IV [dl/g] | Mw [g/mol] | GPC Mw/Mn | Soluble Xylene total % | $^{13}$C-NMR C4 [wt %] | Norb [wt %]-NMR | Tg [° C.] | DSC Tm2 [° C.] | Reactivity ratio Bu/N |
|---|---|---|---|---|---|---|---|---|---|
| 1 | 1.38 | 81448 | 2.56 | 99 | 28.6 | 0 | −50 | 47.8 | — |
| 2 | 1.63 | 125555 | 2.46 | 99 | 11.2 | 17.4 | −16 | nm | 40.47 |
| 3 | 1.73 | 123328 | 2.72 | 99 | 14 | 9.0 | −10 | nm | 36.63 |
| 4 | 1.97 | 123947 | 2.63 | 99.3 | 11.4 | 6.6 | 11 | 48.3 | 23.44 |
| 5 | 2.57 | 162608 | 2.71 | 99 | 23 | 6.2 | nm | 44.0 | Nm | nm = not measured

The invention claimed is:

1. A process for polymerizing ethylene, alpha olefins of formula $CH_2=CHA$ wherein A is a $C_1$-$C_{20}$ alkyl radical, and at least one cycloolefin to form a terpolymer, the process comprising the step of contacting under polymerization conditions ethylene, the at least one alpha olefin of formula $CH_2=CHA$ and the at least one cycloolefin in the presence of a catalyst system obtained by contacting:

a) a compound of formula (I):

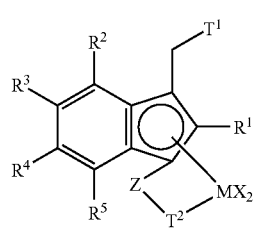

(I)

wherein

M is chromium;

X, equal to or different from each other, is a hydrogen atom, a halogen atom, a R, OR, $OSO_2CF_3$, OCOR, SR, $NR_2$ or $PR_2$ group wherein R is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical; optionally containing heteroatoms belonging to groups 13-17 of the Periodic Table of the Elements; or two X groups can be joined together to form a group OR'O wherein R' is a $C_1$-$C_{20}$-alkylidene, $C_6$-$C_{20}$-arylidene, $C_7$-$C_{20}$-alkylarylidene, or $C_7$-$C_{20}$-arylalkylidene radical;

Z is a divalent bridging group selected from $C_1$-$C_{20}$ alkylidene, $C_3$-$C_{20}$ cycloalkylidene, $C_6$-$C_{20}$ arylidene, $C_7$-$C_{20}$ alkylarylidene, or a $C_7$-$C_{20}$ arylalkylidene radicals, optionally containing heteroatoms belonging to groups 13-17 of the Periodic Table of the Elements, or it is a silylidene radical containing up to 5 silicon atoms; Z can also be an aliphatic or aromatic ring condensed with $T^2$;

$R^1$, $R^2$, $R^3$, $R^4$ and $R^5$, equal to or different from each other, are hydrogen atoms or $C_1$-$C_{40}$ hydrocarbon radicals optionally containing silicon atoms, germanium atoms or heteroatoms belonging to groups 15-16 of the Periodic Table of the Elements or two groups among $R^1$, $R^2$, $R^3$, $R^4$ and $R^5$ can also be joined to form a from 4 to 7 membered ring, that can be aliphatic or aromatic and can contain silicon atoms, Germanium atoms or heteroatoms belonging to groups 15-16 of the Periodic Table of the Elements; said ring can contain at least one $C_1$-$C_{10}$ hydrocarbon radical as substituents;

$T^1$ is a $C_6$-$C_{20}$-aryl radical that can be substituted with at least one $C_1$-$C_{20}$ hydrocarbon radical optionally containing heteroatoms belonging to groups 13-17 of the Periodic Table of the Elements;

$T^2$ is a radical comprising at least one uncharged donor containing at least one atom of group 15 or 16 of the Periodic Table; and b) an alumoxane or a compound that forms an alkyl cromocene cation, the terpolymer comprising:

1) from 90% to 50% by weight of ethylene derived units;

2) from 5% to 40% by weight of derived units of alpha olefin of formula $CH_2=CHA$ wherein A is a $C_1$-$C_{20}$ alkyl radical; and 3) from 2% to 30% by weight of cycloolefin derived units, and having (i) a distribution of molecular weight Mw/Mn lower than 3.5;

(ii) a solubility in xylene at 25° C. higher than 99%; and (iii) a melting point (Tm2) of the polymer that fulfils the following relation:

$$Tm2 < -2.7C + 104,$$

wherein C is the sum of the concentrations of alpha olefins and cycloolefins given by weight; and iv) a glass transition temperature (Tg) of the polymer that fulfils the following relation:

$$Tg > -3.3(C_4*0.34 + C_c*0.71) + 19$$

wherein $C_4$ is the concentration of alpha olefins and $C_c$ is the concentration of cycloolefins given by weight.

2. The process according to claim 1 wherein $T^1$ is a phenyl radical or a naphtyl radical that is substituted with at least one $C_1$-$C_{20}$ hydrocarbon radical optionally containing heteroatoms belonging to groups 13-17 of the Periodic Table of the Elements.

3. The process according to claim 1 wherein in the compound of formula (I), $T^2$ has formula (IIa or (IIb);

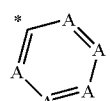

(IIa)

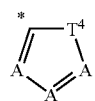

(IIb)

wherein the asterisk (*) marks the position in which the bridge Z is bound, when the bridge Z is a condensed saturated or unsaturated ring the other position in which Z is bound is the position vicinal to the position marked with the asterisk (*); A is a $C(R^7)$ group or a $T^3$ atom, wherein $R^7$ equal to or different from each other, are hydrogen atoms or linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl or $C_7$-$C_{20}$-arylalkyl radicals, optionally containing heteroatoms belonging to groups 13-17 of the Periodic Table of the Elements; or two $R^7$ can also be joined to form a from 4 to 7 membered ring; $T^3$ is a nitrogen or a phosphorous atom; $T^4$ is sulphur, an oxygen atom, or a $NR^7$ group; with the proviso that not more than two A groups are $T^3$ groups.

4. The process according to claim 1 wherein the cycloolefin has general formula (III):

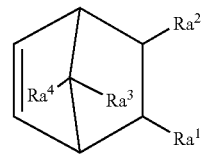

(IV)

wherein $R^1$, $R^2$, $R^3$ and $R^4$, independently from one another, are hydrogen atoms, $C_1$-$C_{20}$ alkyl, $C_3$-$C_{12}$ cycloalkyl or $C_6$-$C_{18}$ aryl, or two of $R^1$, $R^2$, $R^3$ and $R^4$, together with the carbon atom(s) to which they are bound form at least one saturated, partially unsaturated or aromatic ring that bears $C_1$-$C_{20}$ hydrocarbon substituents.

5. The process according to claim 1 wherein the alpha-olefins of formula $CH_2$=CHA are selected from the group consisting of propylene, 1-butene, 1-hexene, 1-octene and 4-methyl-1-pentene.

6. The process of claim 4 wherein $R^1$, $R^2$, $R^3$ and $R^4$, are hydrogen atoms, $C_1$-$C_8$ alkyl, $C_3$-$C_8$ cycloalkyl or $C_6$-$C_{12}$ aryl.

7. The process of claim 5 wherein the alpha olefins are selected from the group consisting of 1-butene and 1-hexene.

8. The process of claim 5 wherein the alpha-olefin of formula $CH_2$=CHA is 1-butene.

* * * * *